Feb. 2, 1965  F. E. KNOEDLER ETAL  3,168,291
BLENDING AUGER
Filed Aug. 1, 1961  3 Sheets-Sheet 1
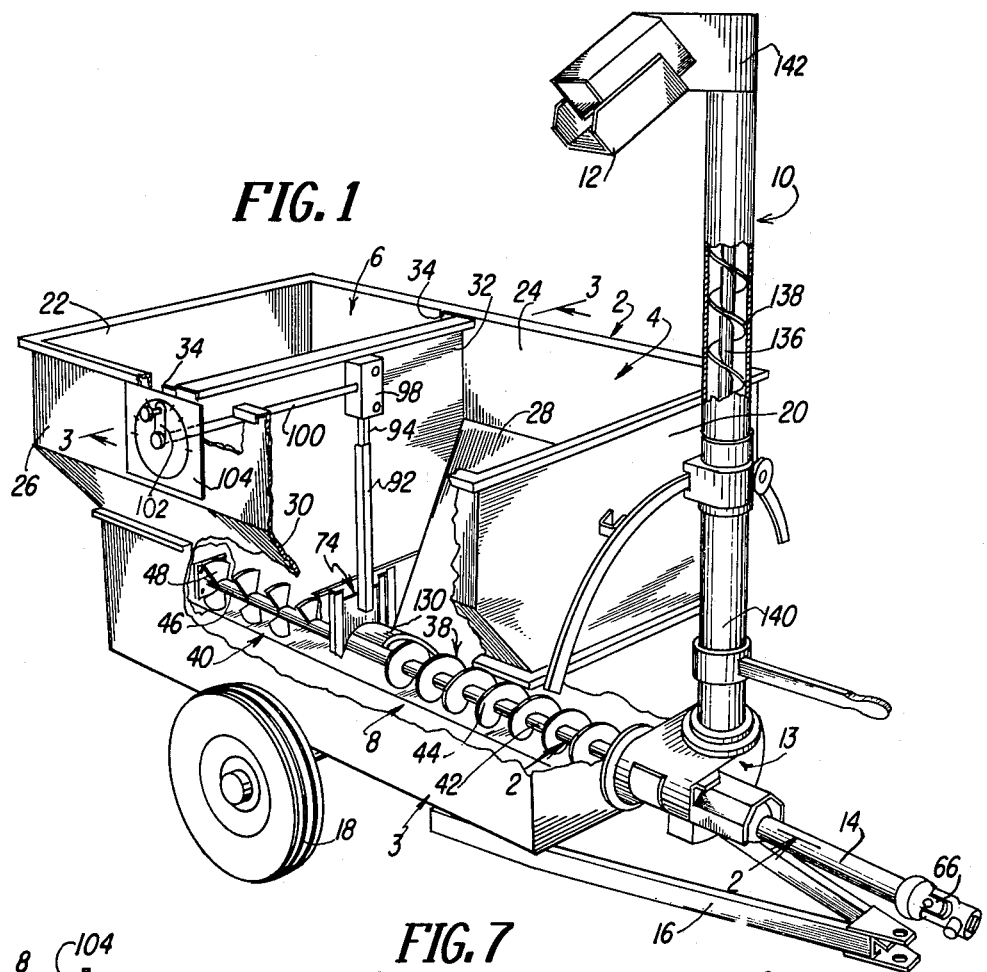
INVENTORS
Fred E. Knoedler
Robert L. Knoedler
BY
Attys.

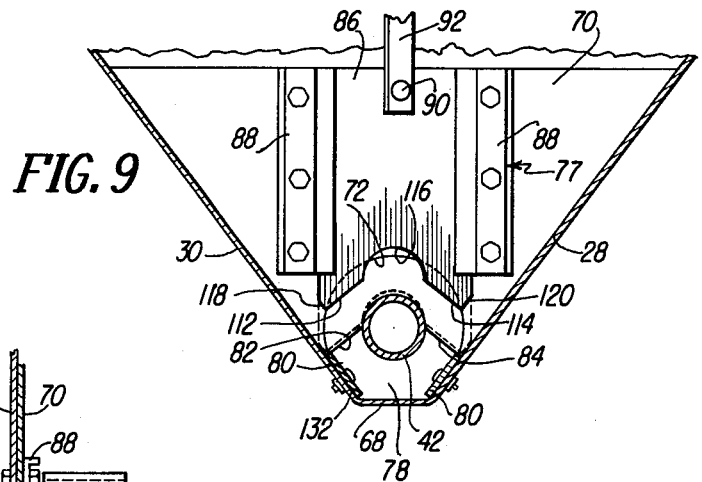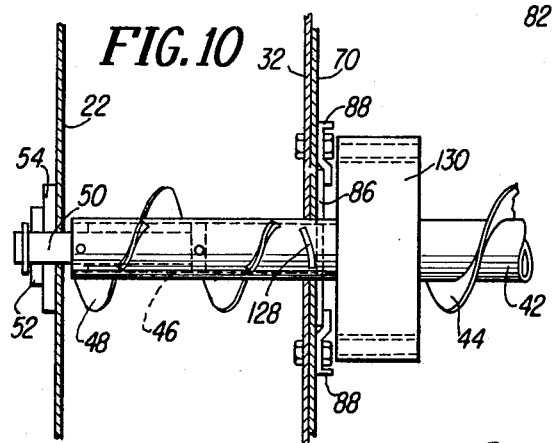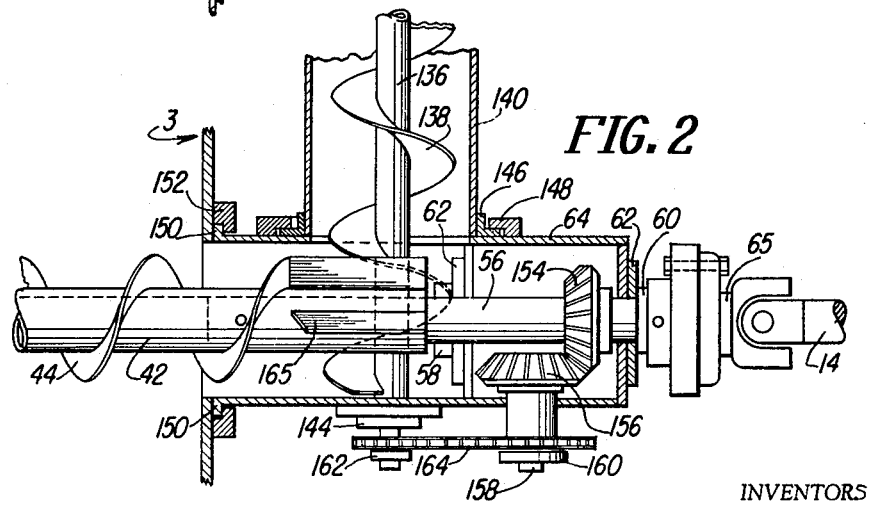

Feb. 2, 1965 F. E. KNOEDLER ETAL 3,168,291
BLENDING AUGER
Filed Aug. 1, 1961 3 Sheets-Sheet 3
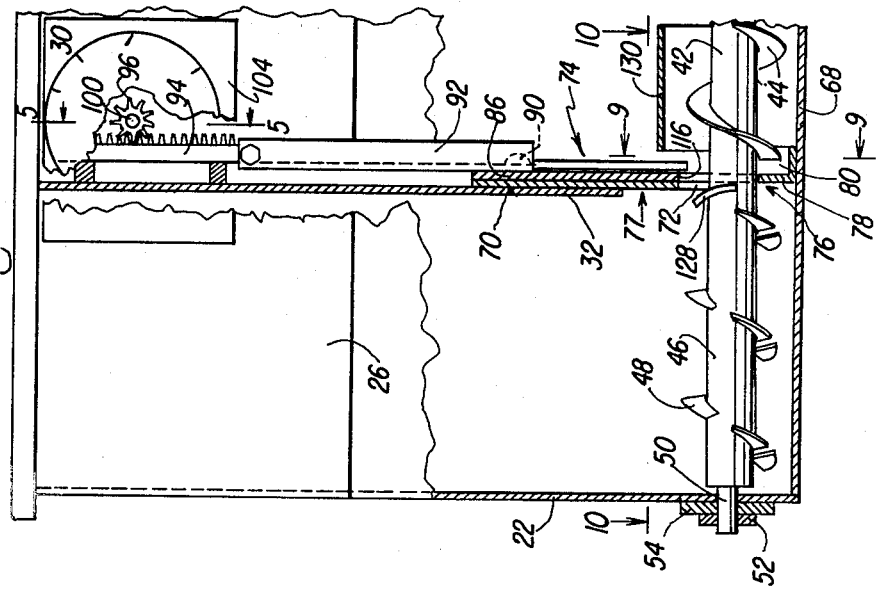
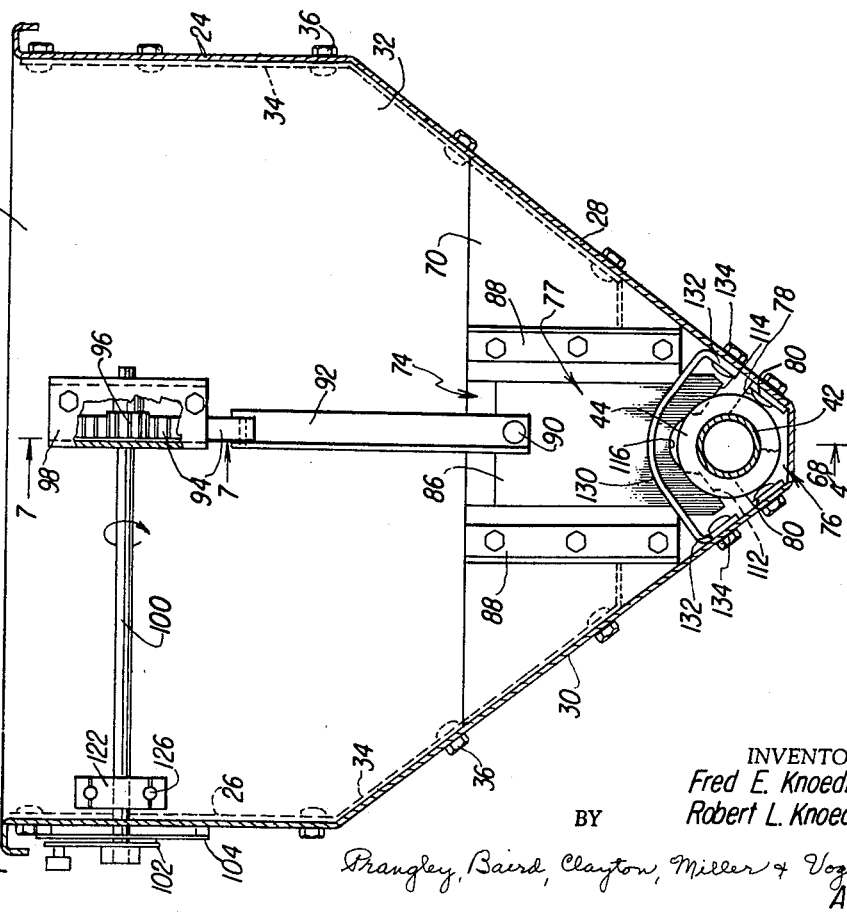
INVENTORS
Fred E. Knoedler
Robert L. Knoedler
BY Prangley, Baird, Clayton, Miller & Vogel
Attys.

United States Patent Office 3,168,291
Patented Feb. 2, 1965

3,168,291
BLENDING AUGER
Fred E. Knoedler and Robert L. Knoedler, Streator, Ill., assignors to Knoedler Manufacturers, Inc., Streator, Ill., a corporation of Illinois
Filed Aug. 1, 1961, Ser. No. 128,429
9 Claims. (Cl. 259—9)

This invention relates to an auger conveyor system, and more particularly to an auger wagon, for farm use.

It is an object of this invention to provide an auger conveyor system for feeding and simultaneously mixing or blending materials such as feed grains, or feeds grains and supplements, from two sources, hoppers or bins, in predetermined proportions.

In preparing feed for livestock, it is necessary for the farmer according to present practices first to measure or weigh the materials to be mixed, or to purchase the materials in packages of predetermined weight or volume, and then to mix the premeasured materials by hand or by means of a mechanical mixer and finally to deliver the properly mixed or blended feed to the various livestock feeders, some of which may be located at remote points from the area or barn where the mixing was accomplished.

Various styles of two-compartment auger wagons have heretofore been provided to enable the farmer to empty premeasured packages of the feed ingredients in layers in one compartment and to blend the ingredients by augering all of the ingredients from the one compartment into the other compartment and then transport the prepared mix to the various livestock feeders. While this provided the farmer with a convenient form of mobile mixer and conveyor it still required the materials to be premeasured or bought in premeasured packages and it also halved the transport capacity of the farmer's wagon. As will be apparent, the cost of packaging and distributing of feed ingredients and supplements in premeasured amounts has materially increased and continues to increase the feed cost to the farmer and the required handling of the numerous and sometimes heavy packages has materially increased the farmer's burdens. Substantial savings in feed costs could be achieved by purchasing the necessary feed ingredients in bulk if the farmer was provided with economical means to mix the feed ingredients in the proper proportion without premeasurement and the burdens on the farmer in handling the feed bags or packages could then also be eliminated.

It is, accordingly, an object of this invention to provide a simple and relatively inexpensive auger or auger system for preparing feed mixes from bulk sources of materials without premeasurement of the several ingredients.

Other and further objects of the invention are to provide for general use an auger conveying system, stationary or mobile, capable of mixing or blending in adjustably predetermined proportions fluent materials (i.e., any materials capable of conveyance by an auger) from two hoppers, bins or compartments, without premeasurement of the amounts of the materials deposited or dumped in the several hoppers or bins, and, more specifically, to provide for farm use a feed mixer, stationary or mobile, having or adapted for use with a pair of bins supplying feed ingredients such as grains and supplements, and comprising an auger or auger system receiving the materials from both bins and including automatic proportioning means associated therewith and adjustably presettable to determine the relative percentages of the ingredients to be contained in the desired feed mix or blend prepared by the auger and delivered by it to a common discharge point.

The present invention contemplates the provision of two two screw conveyor augers, or auger flightings, the first of which under the control of an adjustable feed regulating means partially fills the second auger with one material, such as a feed supplement, and the second auger is then filled to capacity with the other material, such as a primary feed grain, and simultaneously conveys to a desired discharge point the two materials blended in a desired proportion determined by the adjusted setting of said feed regulating means. Now specifically the present invention contemplates the delivery of material to the second auger at an adjustable rate substantially below the capacity of that second auger.

Other and further advantages of the invention will be apparent from the following description when taken in connection with the accompanying drawings, wherein:

FIGURE 1 is a view in perspective of an auger wagon embodying the invention;

FIGURE 2 is an enlarged fragmentary view in vertical section taken substantially along the line 2—2 of FIGURE 1;

FIGURE 3 is a view in vertical section taken substantially along the line 3—3 of FIGURE 1;

FIGURE 4 is a fragmentary view partly in side elevation and partly in vertical section taken along the line 4—4 of FIGURE 3;

FIGURE 5 is a fragmentary view in vertical section taken substantially along the line 5—5 of FIGURE 4;

FIGURE 6 is an enlarged fragmentary view in vertical setcion taken substantially along the line 6—6 of FIGURE 5;

FIGURE 7 is an enlarged fragmentary view in vertical section taken substantially along the line 7—7 of FIGURE 3;

FIGURE 8 is an enlarged fragmentary view in side elevation viewed substantially along the line 8—8 of FIGURE 5;

FIGURE 9 is a fragmentary view in vertical section taken substantially along the line 9—9 of FIGURE 4; and FIGURE 10 is a fragmentary view in horizontal section taken substantially along the line 10—10 of FIGURE 4.

As shown in FIGURE 1, a preferred form of the invention comprises an auger wagon 2 having the usual wagon body 3 carrying a hopper body formed with a front compartment or bin 4 and a rear compartment or bin 6; horizontal auger or screw conveyor means 8; a vertical discharge auger 10 provided with a gravity discharge chute 12; drive means 13 for the horizontal auger 8 and vertical discharge auger 10; a power takeoff 14; a wagon tongue or A frame 16, and the usual wheels 18 of which one only is shown in FIGURE 1.

The hopper body may be formed in the usual manner with front and rear vertical walls 20 and 22, vertical side walls 24 and 26, and sloping side walls 28 and 30 forming a V-trough.

A plate or bulkhead 32 forms with the other walls of the hopper body the front and rear compartments or bins 4 and 6. The plate 32 may be provided with lateral flanges 34 along its opposite edges which are secured to the side walls 24, 26, 28 and 30 as by bolts 36.

The auger means 8 may comprise an auger or auger portion 38 in the front compartment or bin 4 and an auger or auger portion 40 in the rear compartment or bin 6. The auger 38 comprises a hollow tube or shaft 42 to which is secured or welded in the usual manner a continuous spiral flighting or helical blade 44 fashioned to feed the material forwardly of the wagon when the shaft 42 is rotated in a counterclockwise direction as viewed from the front of the wagon.

The auger 40 may also comprise a hollow tube or shaft 46, which in the preferred form is integral with the shaft 42. The shaft 46 is also provided with a spiral flighting or helical blade, preferably formed of convolute paddles 48 forming a discontinuous helix of the same twist, pitch and helix angle as the spiral flighting or helical blade 44. In the preferred form illustrated in the drawings, the angular extent of each paddle is substantially equal to the angle between the confronting radial edges of the adjacent paddles, and the paddles are all of substantially the same external diameter as the flighting 44 so that the material in the rear compartment or bin 6 is fed by the auger 40 at a maximum rate approximately 50% of the rate at which the material is moved through the bin 4 by the auger 38, i.e. the capacity of the auger 40 is approximately one-half the capacity of the auger 38.

The integral auger shaft, composed of the tubular shaft portions 42 and 46, is mounted on and pinned to a stud shaft 50 (FIG. 10) received in the rear end of the hollow shaft portion 46 and mounted in a suitable bearing 52 carried in a bearing bracket 54 bolted or otherwise secured to the rear wall 22 of the hopper body. The forward end of the shaft portion 42 is mounted on and pinned to a stud shaft 56 (FIG. 2) mounted in bearings 58 and 60 carried by bearing brackets 62 mounted on a transfer housing 64. The shaft 56 is connected by the usual universal joint 65 to the power takeoff shaft 14 having at its other end the usual combined universal joint and tractor power takeoff coupling 66.

The feed trough formed by the sloping side walls 28 and 30 is completed by a bottom wall 68 (FIGS. 3, 4 and 9) which may be formed integrally with the walls 28 and 30 and which extends below the auger means 8 and between the front and rear walls 20 and 22.

The bulkhead 32 terminates some distance vertically above the bottom wall 68 (see FIG. 4) and to it there is preferably bolted or welded an auxiliary plate or partition 70 having an opening 72 therein of a diameter slightly greater than the external diameter of the auger blades. Material from the rear compartment is pushed by the auger 40 means through the opening 72 and thereby delivered to the pick-up end of auger 38.

The rate at which the material is delivered from the rear compartment to the pick-up end of the auger 38 is adjustably restricted and determined by feed regulating or control means 74 (FIG. 1) mounted on the bulkhead 32. This control means 74 may comprise a fixed gate 76 (FIGS. 3 and 4) and a cooperating, adjustable gate 77.

The fixed gate 76 preferably comprises a plate 78 positioned within the front compartment 4 in abutting relation to the partition plate 70, the plate 78 having forwardly directed spaced flanges 80 bolted to the walls 28 and 30. The plate 78 extends below the auger shaft 42 between the walls 28, 30 and 68 and partially circumscribes the shaft 42. The upper free edges 82 and 84 of the fixed gate plate 78 are made substantially perpendicular to each other and they diverge from the shaft substantially radially of the opening 72, and downwardly to the bin walls 28 and 30. The fixed gate plate 78 thus substantially or approximately closes or masks one-fourth of the opening 72.

The adjustable control gate 77 preferably comprises a plate 86 slidably mounted relative to the bulkhead 32 as by side guides 88 consisting of angle bars bolted to the auxiliary partition plate 70.

The plate 86 has secured to its forward face a lug or projection 90 to which there is bolted at its lower end a bar 92 connecting the slidable gate plate 86 to a rack bar 94 bolted to the upper end of the bar 92. The rack bar 94 meshes with a pinion 96 mounted in a housing 98 bolted to the bulkhead 32, the housing 98 receiving and guiding the rack 94 and forming a support for one end of a horizontal shaft 100 to which the gear 96 is pinned within the housing 98.

The shaft 100 may, if desired, be furnished with a suitable bearing (not shown) mounted on one of the vertical walls of the housing 98 and the shaft extends parallel to the bulkhead 32 through the side wall 26 of the auger wagon. The shaft at its outer end may be provided with a bearing (not shown) secured to the side wall 26. A position indicating lever 102 is secured to the outer end of the shaft 100 and cooperates with an indicator 104 (see also FIGS. 5 and 8) secured to the outer surface of the wall 26. This indicator 104 may be in the form of a printed sheet, disc, or plate printed or inscribed with an inner scale 106, an outer scale 108, arranged concentrically with the axis of the shaft 100 and cooperating with the point 110 of the lever 102, the two scales indicating the relative percentages of materials from the two compartments delivered by the auger means to the front end of the auger wagon for different settings of the control gate 77.

The plate 86 of the control gate 77 is formed with its lower free edges 112 and 114 parallel to the upper free edges 82 and 84 of the fixed control gate 76, the edges 112 and 114 being substantially perpendicular to one another so as to engage and coincide with the edges 82 and 84 of the fixed gate when the gate plate 86 is in its fully lowered position, as represented by the dash lines in FIGURE 9. The plate 86 is formed with a central part circular opening 116 to receive or encompass the auger shaft 42 as the plate 86 approaches the closed position with reference to the fixed plate 78.

The bottom of the plate 86 is further cut away to provide edges 118 and 120 substantially parallel to the walls 28 and 30 so that the plate rests upon those bin walls when in fully lowered, or closed, position.

Means is provided for frictionally retaining the movable control gate in adjusted position. This means may comprise a pair of friction blocks 122 (FIGS. 3, 5 and 6) mounted on the bulkhead wall 32 in clamping engagement with the shaft 100, as by bolts 124, the blocks being adjustable to provide the desired friction clamping pressure, as by wing nuts 126. The friction blocks 122 are preferably made of hard wood so as to be readily adjusted into such clamping engagement with the shaft 100 as to hold the gate 86 in adjusted position while still permitting the gate to be readily adjusted to a different position.

A convolute cleaning blade 128, of reverse twist as compared to the convolute paddles 48, is secured to the auger shaft 46 in close proximity to, or in wiping engagement with, the rear surface of the fixed gate plate 78 and also the rear surface of the removable gate plate 86 and partition plate 70 so as to remove or scrape from the rear surfaces of those plates any accumulations of viscid or agglutinous materials, such as molasses, with which feed supplements are frequently impregnated.

A chamber or housing about the rear end or "pickup portion," of the front auger flighting 42 is formed by an arcuate plate or shield 130, FIGS. 1, 3, 4 and 10, and the adjacent portions of the hopper walls 28, 30 and 68, the shield 130 extending over the auger 44 and being provided with lateral flanges 132 secured as by bolts 134 to the bin walls 28 and 30. The shield 130 acts as pressure relief means for the outlet side of the gate valve and prevents the material in the front of the compartment from interfering with the delivery of the material from the rear compartment to the front auger.

The vertical auger 10 may comprise the usual vertical auger shaft 136 (FIGS. 1 and 2) provided with the usual spiral auger flighting or helical blade 138 and the usual vertical housing tube 140. The vertical auger shaft may be mounted in the usual manner in a bearing (not shown) at the top of a housing 142 mounted at the upper end of the tube 140, the shaft 136 also being mounted in a bearing 144 secured to the lower wall of the housing 64. The housing 142 is in open communication with the gravity discharge chute 12 to pass the material from the vertical auger to that chute.

As illusrated in FIGURE 2, the vertical housing 140 is mounted in the usual manner for angular adjustment about the vertical axis to direct the gravity chute in any desired direction as by a flanged ring 146 welded to the lower end of the housing tube 140 and rotatably guided on the upper surface of the housing 64 as by a flanged ring 148 secured to the housing 64. In a similar manner, the housing 64 is mounted for angular adjustment about the horizontal axis of the auger shaft 42 as by providing the inner end of the housing 64 with an outwardly directed circular flange 150 received in and guided by a flanged ring 152 fastened to the front wall of the wagon.

The vertical auger 10 and the horizontal auger means 8 are driven by the shaft 56, the shaft 56 being connected to the vertical auger shaft 136 through a bevel gear 154 secured to the shaft 56, a meshing bevel gear 156 mounted on a stud shaft 158, mounted in a suitable bearing (not shown) secured to the housing 64, the shaft 158 carrying a large sprocket 160 connected to a small sprocket 162, secured to the lower end of the shaft 136 as by a sprocket chain 164.

In operation, the materials to be mixed are dumped in bulk, without premeasurement or attempt to proportion the quantities thereof, into the individual compartments or bins 4 and 6. When used to prepare a mix or blend of a primary feed grain with a feed supplement, the primary feed grain is dumped into the compartment or bin 4 and the feed supplement into the rear compartment or bin 6. When the power takeoff shaft 14 is coupled to the power takeoff of the usual tractor and the auger shafts 42 and 46 are driven thereby in a counterclockwise direction, the rear auger 40 will feed the supplement forwardly of the bin 6, and depending upon the setting of the adjustable gate plate 86, a portion of the materials so fed forwardly by the rear auger will pass through the bulkhead opening 72 into the compartment or bin 4 and delivered to the pickup end of the front auger 38, the shield 130 assuring the complete picking up of the material from the rear bin prior to the picking up of the material from the front bin by the auger 38 and relieving the pressure on the outlet side of the control gate.

Depending upon the setting of the control gate, the front auger 38 will be partially filled to a certain percentage of its capacity, with the material delivered by the rear auger to the pickup end of the front auger and thereafter filled to its full capacity with the material in the front compartment 4. It is the characteristic of an auger or screw conveyor at the bottom of a hopper to pick up material at its "remote" end and then move that picked up material forwardly through the main body of material in the hopper as though the auger was rotating in a confining tube extending from the point where the auger was filled to capacity to the discharge or "near" end of the auger. The front auger 38 thus carries and mixes or blends the material delivered to its "remote" end from the bin 6 with the material picked up, to the capacity of the auger, from the bin 4 and delivers the mix, at the rate determined by the capacity of the auger 38 to the transfer housing 64, the radially directed, longitudinally extending blades 165, FIGURE 2 at the forward ends of the auger 38 applying sufficient pressure to the materials to assure that all of the material is picked up by the auger flighting 138 and carried upwardly of the auger housing 140 and ultimately discharged through the gravity discharge chute 12.

It has been found that the materials delivered by the auger 38 are well blended mixtures of the two ingredients or materials dumped in bulk into the bins 4 and 6 and that the relative proportions or percentages of the ingredients in the mix are accurately determinable by the setting of the adjustable gate 86.

For any two fluent materials to be mixed, the scale or scales of the indicated plate 104 may be readily calibrated for different angular positions of adjustment of the adjusting lever 102 so that after such calibration, those two ingredients, and others of similar physical characteristics, may be blended in any desired relative percentages or proportions, by merely setting the adjusting lever 102 to the proper markings on the scale 106 or the scale 108.

So long as the materials to be mixed are of the same or similar physical characteristics as the materials for which the indicator plate 104 has been calibrated, no further or other calibration is required. If, however, one or both of the materials desired to be mixed is or are so substantially different in physical characteristics from the materials previously handled as to significantly affect the feed capacity of the auger means, it may be necessary or desirable to recalibrate the indicator plate 104. For example, if a feed supplement in the form of pulverized material previously mixed is replaced by a material in the form of capsules, it may be necessary to recalibrate the indicator by trial mixes to determine the proper settings for the proper proportioning of such capsules with the same primary feed grain.

Since the material in compartment 6 is pushed forward by the rear auger against the bulkhead and the control gate restricts the free movement of the material through the opening in the bulkhead the excess material, over and above that which passes through the openings 72, is forced upwardly along the rear wall of the bulkhead and then moves backwardly within the compartment as the material adjacent the rear wall is picked up by the auger. This natural circulation or "boiling," which increases as the control gate is moved toward the closed position, is minimized by the use of a discontinuous auger flighting in the compartment 6 for the spaces between the paddles permit a relief of the forward feeding pressure. This minimizing of the "boiling" of the material within the bin 6 is of particular importance and necessity in connection with the mixing or blending of feeds impregnated with materials such as molasses that under the pressure, and consequent heat, built up under those circumstances tend partially to liquify or become sticky and to foul the walls of the bin and the auger surfaces, requiring frequent cleaning.

For the mixing and blending of materials which are not deleteriously affected by such "boiling" or by the pressures generated when the movable control gate is in near closed position, the convolute feed paddles may be made larger in angular extent. For the blending only of materials which are of a nature and character such as to be unaffected by such heat and pressure, it may be possible or desirable to use a rear auger having a continuous spiral flighting or helical blade of the same or smaller diameter than the diameter of the flighting of the auger 38.

It will be evident that it is preferable to employ the bin 6 and the discontinuous rear auger 40 for viscid or agglutinous material or for the smaller volume ingredient of the mix, although where the proportions are more nearly equal or where the materials to be blended are both relatively insensitive to pressure and heat, the bins and augers may be of the same dimensions and structures and either bin used for either ingredient.

The shield 130 minimizes the pressure on the outlet side of the control gate and assures that the material from the compartment 6 is delivered to the pickup end on the auger 38 at a rate determined substantially solely by the setting of the control gate and not by the quantity or height of the material in the front compartment. It assures that the front auger is at all times during its operation filled, or more accurately partially filled, to a definite percentage of its capacity as determined by the setting of the control gate and so that it will at all times receive from the compartment 4 material at a constant adjusted rate properly proportioned to the capacity of the auger 38.

The blended material is fed by the auger 38 to the transfer chamber within the housing 64, at one side of the vertical auger 10, and forcibly delivered by the feed fins to the lower, pickup end of the vertical auger so that no material accumulation is built up in the transfer chamber but the material is removed from the chamber by the auger 10 at the same rate as it is delivered thereto by the auger 38.

It will be evident from the foregoing description that applicants have provided by means of this invention a simple and relatively inexpensive auger or auger system for extracting seriatim from two hoppers or bins, or other sources, definite proportionate amounts of fluent materials which are then blended and mixed and conveyed to a desired discharge point.

While the invention has been shown in its preferred form as incorporated in an auger wagon enabling a farmer or feeder of livestock to purchase desired feeds and supplements in bulk and to mix or blend various feed ingredients, or feeds and supplements, in various proportions as desired or required without premeasurement of the quantities or weights and to deliver the mixed or blended feeds to remote livestock feeders, it will be evident that the invention in its broadest aspects may be readily adapted for use in simultaneously mixing or blending any two solid materials capable of being fed by an auger, and it will be appreciated by those skilled in the art that other modifications and improvements may be made without departing from the essence and scope of the appended claims.

What we claim is:

1. A self proportioning feeder for two different bulk materials comprising a pair of bins for separately supplying the two materials to be fed, a pair of operatively interconnected augers, a first one of said augers being positioned to receive the first material from a first one of said bins, the second auger being positioned to receive the second material from the second bin and operatively associated with the first auger to receive in advance of the second material from the second bin the first material delivered by the first auger from the first bin, and adjustable means for regulating the rate of delivery of the first material by the first auger to the second auger whereby to partially fill the second auger with the first material from the first bin in predetermined proportion to the feed capacity of the second auger.

2. A self-proportioning feeder for bulk materials comprising a pair of bins separately supplying the bulk materials to be fed, a pair of augers, one for each of said bins and operatively positioned to receive the materials from the bins, said augers being operatively interconnected for the delivery of materials by one auger to the other auger and for discharge by said other auger, an adjustable means interposed between said augers for regulating the rate at which the material is delivered by said one auger to said other auger to a desired proportion of the capacity of such other auger.

3. A self-proportioning feeder for bulk materials comprising a pair of hoppers separately supplying bulk materials to be fed, auger means positioned to receive bulk materials from one of said hoppers and extending into, through and from the other hopper to receive material from the other hopper and carry a mix of the two materials to a discharge point, and adjustable proportioning means for restricting the movement of the material from said one hopper by said auger to a predetermined rate less than the capacity of the auger to proportion the two materials in such mix.

4. A self-proportioning feeder and blender for bulk materials comprising a hopper having a partition dividing the hopper into two bins for individually receiving the bulk materials, auger means positioned in the bottom of the hopper and extending therefrom to discharge materials from the hopper, said auger having a spiral flighting interrupted in the plane of said partition and extending on the opposite sides thereof, said partition having an opening therethrough positioned relative to the auger to permit passage of materials from one bin to the other bin as the auger is rotated, and adjustable gate means operatively associated with said partition for restricting the movement of materials through said opening from one bin to the other to adjust the percentages of materials fed by said auger from said two bins.

5. A self-proportioning feeder and blender comprising a hopper having a partition therein dividing the partition into a bin for supplying a primary feed material and a bin for supplying a feed supplement, an auger in the bottom of said hopper and extending from the supplement bin through said partition and through and from the other bin to discharge a blended mixture of said feed and said feed supplement from said hopper, said auger having a spiral flighting interrupted in the plane of said partition, said partition having an opening therein about said auger for passage of material fed by the auger flighting in the supplement bin to the auger flighting on the other side of said partition, and adjustably presettable gate means operatively associated with the said partition for restricting the movement of the feed supplement through said opening from the supplement bin to the other bin to a predetermined percentage of the capacity of the auger whereby to control the proportion of supplement and primary feed discharged by the auger from the hopper.

6. An auger wagon comprising a box having a transverse partition therein dividing the box into bins for separately receiving in bulk materials to be blended, an auger positioned in the bottom of the box and extending therefrom to discharge the materials from the box, said partition having an opening therein through which the auger extends, and through which the material from one bin is moved by the auger, said auger having a spiral flighting interrupted at said partition, and adjustable gate means operatively associated with said partition for adjustably restricting the movement of the material through said opening under the action of the auger to a predetermined rate in relation to the capacity of the auger.

7. An auger wagon as set forth in claim 6 including means forming adjacent the outlet side of the gate means, a chamber through which the auger passes for receiving material discharged through the opening into the other bin for a re-pickup by the auger.

8. An auger wagon having a box for receiving, transporting, and discharging bulk materials, a horizontal auger in the bottom of said box and extending from end to end thereof and from said box at one end, a vertical auger mounted at said one end of the box and operatively connected to the horizontal auger, said box having a partition therein dividing the box into separate compartments for receiving in bulk materials to be blended, said partition having an opening through which the horizontal auger extends and through which the material is moved from one compartment to the other, said horizontal auger having a spiral flighting interrupted at said partition, adjustable gate means operatively associated with the opening in said partition to restrict the movement of the material through said opening to a rate in predetermined proportion to the capacity of the auger flighting in said other compartment, and means forming a shield about the auger flighting within said other compartment for relieving the pressure against the outlet side of said gate means.

9. A self proportioning and material blending auger wagon comprising a box having a transverse partition therein dividing the box into bins for separately receiving in bulk two different materials to be blended, an auger positioned in the bottom of the box and extending therefrom to discharge the materials from the box, said partition having an opening therein through which the auger extends and through which the material from one bin is moved by the auger, said auger having a spiral flighting interrupted at said partition, an adjustable gate means operatively associated with said partition for adjustably